United States Patent [19]

Brown et al.

[11] 3,956,534

[45] May 11, 1976

[54] METHOD OF SPRAY FORMING GLASS COATING ON CONCRETE BLOCKS

[75] Inventors: Earle C. Brown, Oakville; J. Dennis Jones, Weston, both of Canada

[73] Assignee: Ontario Research Foundation, Sheridan Park, Canada

[22] Filed: Mar. 6, 1973

[21] Appl. No.: 338,631

[30] Foreign Application Priority Data

Mar. 7, 1972 United Kingdom............... 10652/72

[52] U.S. Cl............................... 427/243; 427/245; 427/314; 427/423; 427/445
[51] Int. Cl.² ........................................... B32B 5/16
[58] Field of Search ............ 117/46 FS, 125, 105.2, 117/23; 106/52, 53, 54; 427/314, 423, 245, 243, 445

[56] References Cited
UNITED STATES PATENTS

| 1,566,911 | 12/1925 | Nelson | 117/105.2 |
| 1,585,990 | 5/1926 | Houghton | 117/105.2 |
| 1,617,166 | 2/1927 | Schoop | 117/46 FS |
| 2,813,305 | 11/1957 | Robson et al. | 117/23 X |
| 3,200,310 | 8/1965 | Carman | 117/125 X |
| 3,418,156 | 12/1968 | Medert et al. | 117/125 X |
| 3,457,102 | 7/1969 | Grekila et al. | 117/125 X |
| 3,674,520 | 7/1972 | Suzuki et al. | 106/54 |
| 3,715,228 | 2/1973 | Dulat | 117/125 X |

FOREIGN PATENTS OR APPLICATIONS

| 179,216 | 11/1920 | United Kingdom | 117/46 FS |

*Primary Examiner*—Harry J. Gwinnell
*Assistant Examiner*—Dennis C. Konopacki
*Attorney, Agent, or Firm*—Sim & McBurney

[57] ABSTRACT

Concrete blocks and similar inorganic non-metallic building components may be provided with a glass coating on an external surface by flame spraying. The surface to be coated usually is heated prior to spraying.

11 Claims, No Drawings

METHOD OF SPRAY FORMING GLASS COATING ON CONCRETE BLOCKS

FIELD OF INVENTION

The present invention relates to the provision of glass coatings on surfaces of concrete blocks or other inorganic building elements.

BACKGROUND TO THE INVENTION

Concrete blocks are widely used in construction due to their economical nature, durability and easy erection. They suffer from the disadvantage, however, that they are unappealing to the eye. Hence, to enhance their aesthetic appeal, concrete block structures have been provided with outer facings or coatings, usually in the form of paints or coatings of epoxy and polyester resins. Many of such organic coatings, however, are expensive and suffer from durability problems, particularly when exposed externally.

Glass also has been suggested as a coating material for ceramic materials, including brick, and coatings have been provided by applying a coating of glaze to the article followed by fusing of the coating at elevated temperature. While this procedure is capable of providing a glass coating on certain ceramic materials, it is totally unsuitable for concrete blocks since concrete blocks generally are subject to deterioration during the fusing step. In addition the procedure is uneconomic.

SUMMARY OF INVENTION

In accordance with the present invention, inorganic non-metallic building elements, typically concrete blocks, are coated with glass by flame spraying of fused glass onto a surface of the element.

While the present invention is directed broadly to inorganic non-metallic building elements it will be described hereinafter with particular reference to concrete blocks, although other building elements, such as clay bricks, asbestos cement products and fire bricks also may be provided with an external glass coating.

Concrete expands and contracts upon changes in temperature or water content. Hence it is preferred to provide a glass film on the rough surface of the block which is thin and continuously undulating. Stresses applied by the substrate to a totally non-planar surface will cause the surface to be bent or flexed rather than compressed and elongated. Elongation in a plane causes glass to fail in tension, as may be shown by the cracking of glass as it is cooled on certain substrates. Glass has good flexural strength, however, and accepts contraction and expansion of the substrate, if this movement is applied to the glass film as only a flexural stress.

The latter discussion refers to integral, nonporous glass coatings. However, in many instances, porous glass coatings may be required and used. Such porous coatings may take one of two forms. In one form, gross holes may occur periodically over pores in the substrate, or, in the other form, a large number of small pores may be provided.

Generally, porous coatings take the latter form since, in many instances, due to the rough nature of substrate surface, the glass does not penetrate every crevice of the surface. Both forms of porous coating allow the substrate to "breathe", i.e. to expire and admit water and air as conditions of humidity and temperature demand.

The above discussion relates to ideal surfaces and the concepts represent the ideal results which are attempted. However, actual surfaces of concrete blocks are rough, rather than gently undulating, and have pores to the interior which may, or may not, be bridged by the glass layer. Further, the glass film usually is uneven in thickness rather than the ideal thin film of substantially constant thickness.

DESCRIPTION OF PREFERRED EMBODIMENTS

The flame spraying of the glass onto the concrete surface may be achieved using any convenient flame spraying equipment, typically one or more flame spraying guns, such as those available commercially from Metco Inc. of Westbury, N.Y. The flame employed usually is an oxy-acetylene flame, which generally has a nozzle temperature of about 3000°C. Other flames, having lower temperatures, may be used, such as natural gas-oxygen and hydrogen-oxygen flames. The velocity and the oxidation-reduction character of the gases in the flame also may vary widely. The characteristics of the flame are controlled so that the glass is at least partially fused upon encounter with the flame and upon reaching the surface to be coated the particles remain at least partially fused, so that upon engagement with the surface, the particles wet and hence stick to the surface and coalesce together.

The gas velocity affects the penetration of the glass into the irregular concrete block surface, hence affecting the adhesion of the glass to the surface and the total of the surface area of the surface covered. Changes in gas velocity may affect the manner of coalescence of the glass particles on the surface and hence the appearance of the glass surface. Air jets may be used, if desired, to shape the flame.

Generally, glass compositions having a low fusion temperature are preferred for the spraying, typically containing large quantities of lead oxide or zinc oxide. Typically, such fusion temperatures range from about 300° to about 500°C, with melting temperatures ranging from about 700° to about 1000°C. A typical glass composition (A) which may be used is:

| Lead oxide | (PbO) | 65 to 69 % |
| Silica | ($SiO_2$) | 23 to 29 % |
| Boron oxide | ($B_2O_3$) | 7 to 8 % |
| Sodium oxide | ($Na_2O$) | 0.6 to 0.8 % | having a fusion temperature of 460° to 480°C and a melting temperature of 700° to 760°C. Other glass formulations which may be flame sprayed in accordance with the present invention include:

| Composition B | (Fusion temperature: 320°C Melting temperature: 790° to 840°C) | |
| --- | --- | --- |
| Boron oxide | ($B_2O_3$) | 27 % |
| Silica | ($SiO_2$) | 53 % |
| Alumina | ($Al_2O_3$) | 9 % |
| Sodium oxide | ($Na_2O$) | 4 % |
| Potassium oxide | ($K_2O$) | 1 % |
| Calcium oxide | (CaO) | 5 % |
| Strontium oxide | (SrO) | 1 % |
| Composition C | (Melting temperature: about 1000°C.) | |
| Silica | ($SiO_2$) | 72 % |
| Sodium oxide | ($Na_2O$) | 15 % |
| Calcium oxide | (CaO) | 8 % |
| Magnesium oxide | (MgO) | 4 % |

| Composition C | -continued (Fusion temperature: 320°C Melting temperature: 790° to 840°C) | |
|---|---|---|
| Alumina | ($Al_2O_3$) | 1 % |

Composition C is bottle glass and represents a difficult glass to spray with an oxy-acetylene flame, but nevertheless it is possible to achieve a satisfactory coating.

Due to the volatility of some of the components of the glass compositions sprayed, the composition of the glass coating may vary from that of the composition sprayed.

The glass composition to be sprayed is fed to the flame of the gun in powder form and the particles are melted and conveyed in the gases to the surface to be coated. The average particle size of the glass powder may vary widely, preferably from about 50 to about 150 mesh, more particularly from about 70 to about 140 mesh. The particle size is chosen to provide a free-flowing of glass through the gun. The particular particle size distribution usable in a particular system is dependent on flame characteristics, flame temperature, size of flame and the distance from the gun to the substrate.

Another characteristic of the glass composition to be sprayed which is of significance is the coefficient of thermal expansion of the sprayed coating. Preferably, the coefficient of expansion of the coating is substantially the same as, or slightly lower than that of the substrate surface. In this way, the glass coating is not stressed and, preferably, is in a moderate state of compression. Generally, the coefficient of thermal expansion of the glass composition sprayed is less than $8 \times 10^{-6}$ in/in/°C., typically from about 4 to $8 \times 10^{-6}$ in/in/°C.

In a preferred embodiment of the invention, the surface of the concrete block is heated immediately prior to spraying with glass. It is possible to spray the glass onto a surface which is not preheated. However, if the concrete block surface has hydrated materials or free water in it, water is evolved upon contact of the hot glass with the surface. Further, any air pockets in the surface region tend to expand and attempt to escape from the surface. Also, where the concrete block includes carbonates, these may be decomposed in the surface region evolving carbon dioxide. These effects result in bubble formation in the sprayed coating. While in some cases this effect may be tolerated, it is difficult to control.

The preheating procedure pre-evolves the gas and the decomposition products insulate the surface of the substrate somewhat, allowing the glass to be deposited on the surface without occluding additional evolved gases. Reproducible results are obtainable in this way.

In some instances, the problems of gas occlusion may be overcome by providing a porous glass coating on the block surface, so that evolved gases escape through the pores. Nevertheless, to ensure control of the results, even when a porous coating is to be formed, it is preferred to preheat the surface to be coated.

The preheating may be achieved in any convenient way, such as by use of the flame from the spray gun prior to feed of the glass composition to the flame. Alternatively, a separate flame, typically a natural gas - air flame, may be used. The preheating preferably is carried out to provide a surface temperature of at least 150°C, although higher temperatures may be employed. This may be achieved by a short exposure, typically 3 to 4 seconds in a natural gas - air flame.

The flame spraying process of the present invention may be used to apply coatings of about 0.1 to 0.8 mm average thickness on the surface. Preferably, glass is applied to the surface at a rate of about 0.08 gm/sq.cm, which is equivalent to an average thickness of about 0.4 to 0.5 mm.

Colored coatings are achievable using the process of the present invention by the incorporation of pigments into the glass composition sprayed. Any colored glass may be used or a coloring chemical, for example, copper carbonate, may be incorporated into the glass powder fed to the spray gun flame.

The color of the coating depends on the pigment employed. Some pigments, typically copper-based materials, are oxidation-reduction and heat sensitive and undergo color changes. Hence, in some instances, it is possible to vary the color of the coating obtainable from a particular glass composition by varying the distance between the spray nozzle and the surface, and/or the oxidation-reduction characteristics of the flame.

The quantity of pigment incorporated into the glass depends on the type of pigment and the intensity of the color desired. Typical quantities are about 1% of the total for cobalt-based pigments and about 7 to 8% of the total for copper-based pigments.

The color of the coating also may be varied by incorporating an inert filler in the glass composition fed to the spray gun. Such fillers also may render the coatings opaque. Typical fillers include alumina, mica and titania and are added in powder form to the glass powder in the desired quantity. Such quantities may be up to 40% of the total composition, typically around 10 to 20%. The texture of the glass coating may be affected by the incorporation of the filler, depending on the quantity employed.

The surface of the concrete block to be coated by the process of the present invention may be subjected to pretreatment to achieve a variety of effects. Such pretreatments may be immediately followed by spraying or may be followed by heating and then spraying.

For example, the pores of the surface of the block may be filled in, at least partially, to smooth out the surface to be coated, so that a smoother glass coating may be provided. This may be achieved by grinding the surface of the block, or by the use of a filler which is a suspension of silica powder or flour in a potassium silicate solution. Other inert fillers may be used. The potassium silicate acts mainly as a wetting agent and may be used alone, if desired.

An additional pretreatment which may be employed is to introduce a glassy substance into the surface. The presence of a glassy substrate in the surface promotes the adhesion of the sprayed glass to the surface. Typical sources of such glassy substances are hearth slag and expanded slags. Any other aggregate, fusible at the temperatures of operation of the process, may be used. The fusible aggregate may be introduced into the surface, by the use of a cement slag mixture, by casting it into the surface to be sprayed by coating the block mold with the aggregate prior to introduction of the mix, or by mixing the aggregate into the components used to the concrete block.

Usually one surface of the block is coated in accordance with the process of the invention, although any number of the surfaces may be coated by using the present invention. Where the surfaces on opposite sides of the block are coated, the coatings may be the same or different.

On any particular surface being coated, the coating may be formed in as uniform a manner as possible, or non-uniform coatings, such as with color variations across the surface, may be provided.

Where initial heating of the concrete block surface to be sprayed has occurred, following coating rehydration of the block surface is required. The rehydration may be carried out in any convenient manner, such as by outdoor exposure to rainfall, or by a further processing step using a high humidity environment, autoclaving or the like.

The process of the present invention enables the economic production of a concrete block having one or more faces coated with glass to be accomplished. The nature, durability, quality, color and thickness of the coating are controllable as discussed above.

EXAMPLES

EXAMPLE 1

A glass conforming to the following approximate compositional anaylsis:

| Lead oxide | (Pbo) | 65 to 69 % |
| Silicon oxide | ($SiO_2$) | 23 to 29 % |
| Boron oxide | ($B_2O_3$) | 7 to 8 % |
| Sodium oxide | ($Na_2O$) | 0.6 to 0.8 % | was ground and sieved. The fraction having particles less than 50 mesh and greater than 150 mesh was retained for spraying. Chromium oxide ($Cr_2O_3$) was added to and mixed with this fraction as a coloring material at a concentration of 2% by weight.

A concrete building block having the approximate composition:

| Portland cement | 8.0 % |
| Silica | 4.6 % |
| Lightweight aggregate | 80.5 % |
| Sand | 6.9 % | and prepared by the well-known autoclaving process was dried at 100°C. The glass-chromium oxide mixture was sprayed through a flame-spray gun (Metco Inc., Model 5P) operating at flow rates of 33 cubic feet per hour for acetylene and 56 cubic feet per hour for oxygen at a surface of the block having the dimensions 2¼ × 7⅝ inches. The block was positioned about 4 inches from the spray gun and the surface was sprayed uniformly for a time sufficient to deposit about 8 grams of glass on the surface, i.e. about 0.08 grams/sq.cm of the surface. Before spraying began the surface of the block was heated for a short period of time with the oxy-acetylene flame alone. After spraying the block and glass surface are allowed to cool in air and was soaked in water to ensure rehydration.

The product was a smooth green glass surface conforming to the surface of the brick and having some porosity.

EXAMPLE 2

Example 1 was repeated using the following glass composition:

| Boron oxide | ($B_2O_3$) | 27 % |
| Silica | ($SiO_2$) | 53 % |
| Alumina | ($Al_2O_3$) | 9 % |
| Sodium oxide | ($Na_2O$) | 4 % |
| Potassium oxide | ($K_2O$) | 1 % |
| Calcium oxide | (CaO) | 5 % |
| Strontium oxide | (SrO) | 1 % | with which was mixed 1% by weight of chromium oxide ($Cr_2O_3$).

The product had a rough matte green glass coating.

EXAMPLE 3

Example 1 was repeated using the following glass composition:

| Silica | ($SiO_2$) | 72 % |
| Sodium oxide | ($Na_2O$) | 15 % |
| Calcium oxide | (CaO) | 8 % |
| Magnesium oxide | (MgO) | 4 % |
| Alumina | ($Al_2O_3$) | 1 % | with which was mixed 1% by weight of cobalt oxide $Co_2O_3$.

The glass composition was flame sprayed through the gun operating at flow rates of 37 cubic feet per hour of acetylene and 56 cubic feet per hour of oxygen. In addition, air was aspirated through the gun at a pressure of 15 psi.

The resultant block had a thin pebbly pale blue glass coating on the surface.

EXAMPLE 4

Example 1 was repeated using the same glass composition but the chromium oxide was replaced by 7.5% by weight of copper carbonate. The block was preheated using a natural gas - air flame.

The concrete block resulting from the procedure had a smooth glass coating with variable color from green to green-black.

EXAMPLE 5

Example 4 was repeated using a gun operating at an acetylene flow rate of 41 cubic feet per hour and an oxygen flow rate of 52 cubic feet per hour.

The glass coating was smooth and had a reddish-brown color.

EXAMPLE 6

Example 4 was repeated using a gun spraying from a distance of 8 inches from the surface. The glass coating was rough and matte and had a yellowish-green color with some brown mottling.

The results of Examples 5 and 6 demonstrate the manner in which differing results may be obtained from the same glass composition containing a heat sensitive pigment by varying the process parameters.

EXAMPLE 7

Example 1 was repeated using 1% by weight of cobalt oxide in place of the chromium oxide. The concrete block sprayed was prepared from the composition:

| Portland cement | 7.7 % |
| Silica | 4.4 % |
| Lightweight aggregate | 70.3 % |
| Sand | 17.6 % |

The block was preheated using a natural gas - air flame.

The resultant product had a smooth dark blue glass coating.

EXAMPLE 8

Example 7 was repeated with titanium dioxide added to the glass composition to provide a titanium dioxide content of 20% by weight.

The resulting concrete block had a rough textured glass coating having a pastel blue color.

EXAMPLE 9

Example 4 was repeated applying about 18 grams of glass uniformly on the surface. The resultant concrete block had a reddish-brown glass coating of average thickness about 0.8 mm.

EXAMPLE 10

Example 4 was repeated applying about 3 grams of glass uniformly on the surface. The resultant concrete block had a reddish-brown glass coating of average thickness about 0.1 mm.

EXAMPLE 11

Example 1 was repeated except that the surface to be sprayed first was treated with a mixture of silica flour suspended in an aqueous solution of potassium silicate. The treatment mixture was formed by suspending 600 grams of silica flour in 240 grams of Kasil No. 1 (National Silicate — a potassium silicate solution), followed by dilution with 150 grams of water. The surface to be sprayed was coated with this mixture to fill the pores of the surface. Following drying of the coating, the block was sprayed as described in Example 1.

The concrete block obtained had a flat smooth green glass surface.

EXAMPLE 12

Example 11 was repeated but the surface treatment in this case used a cement-slag mixture. The coating mixture was formed by adding 125 grams of No. 1 Portland cement and 375 grams of air cooled slag to 150 grams of water. The coating was applied to fill the pores in the surface.

The resultant concrete block had a flat smooth green glass surface.

EXAMPLE 13

Example 7 was repeated using a concrete block prepared from the following composition and having a face to be coated dimensioned 7⅝ × 15⅝ inches:

| | |
|---|---|
| Portland cement | 3.7 % |
| Hydrated lime | 6.9 % |
| Silica | 3.0 % |
| Stone | 12.9 % |
| Sand | 61.0 % |
| Limestone | 18.5 % |

The product had a dull blue glass surface conforming to the surface of the block.

EXAMPLE 14

Example 13 was repeated using a concrete block formed from the following composition:

| | |
|---|---|
| Portland cement | 4.4 % |
| Hydrated lime | 1.1 % |
| Silica | 6.4 % |
| Coarse slag | 21.8 % |
| Fine slag | 53.3 % |
| Sand | 13.0 % |

The product had a smooth blue glass surface conforming to the surface of the block.

EXAMPLE 15

Example 7 was repeated with the block being soaked in water for 24 hours to ensure rehydration after cooling. A plurality of blocks formed in this manner were built into a wall which was left exposed to outside weather under extremes of conditions in Southern Ontario for a period of 1 year. At the end of that time the coated surfaces had no observable sign of degradation, indicating the durability of coatings formed in this manner.

EXAMPLE 16

Example 7 was repeated but powdered alumina was added to the glass composition to an amount of 20% by weight. Before spraying of the surface of the block the block was not predried or preheated. The glass composition was flame sprayed from a distance of 8 inches to deposit uniformly about 3 grams on the surface. The blocks were not purposely rehydrated.

While the product was a block having a thin pale blue glass coating with a matte texture and was acceptable for use where extremes of conditions are not experienced, a wall built of a plurality of similarly-formed blocks exposed to outside weather extremes exhibited spalling of the glass coatings from the blocks after only about 4 months.

Modifications are possible within the scope of the invention.

What we claim is:

1. A method of coating a surface of a concrete building element which comprises heating said surface to a temperature of at least 150°C, introducing glass particles into a flame comprising combusted gases at a high temperature and having a substantial velocity, said glass particles being formed from a glass having a fusion temperature of about 300° to about 500°C and a melting temperature of about 700° to about 1000°C and a coefficient of thermal expansion substantially that of said surface and less than $8 \times 10^{-6}$ in/in/°C, fusing at least partially said glass particles, directing the flame containing said at least partially fused particles at said surface after completion of said heating of said surface, collecting said particles on said surface while said particles are at least partially fused, whereby said particles wet and adhere to said surface and adjacent particles coalesce on said surface to provide a glass film on said surface, sufficient glass being sprayed onto said surface to provide said film with an average thickness of about 0.1 to 0.8 mm, said film being porous, and rehydrating said surface after the formation of said glass film.

2. The method of claim 1 wherein said glass particles have an average particle size of from about 50 to about 150 mesh.

3. The method of claim 2 wherein said glass particles have an average particle size of from about 70 to about 140 mesh.

4. The method of claim 1 wherein said glass has a composition:

| | | |
|---|---|---|
| Lead oxide | (PbO) | 65 to 69 % |

| | | |
|---|---|---|
| Silica | (SiO$_2$) | 23 to 29 % |
| Boron oxide | (B$_2$O$_3$) | 7 to 8 % |
| Sodium oxide | (Na$_2$O) | 0.6 to 0.8 %. |

5. The method of claim 1 wherein said glass has a composition:

| | | |
|---|---|---|
| Boron oxide | (B$_2$O$_3$) | 27 % |
| Silica | (SiO$_2$) | 53 % |
| Alumina | (Al$_2$O$_3$) | 9 % |
| Sodium oxide | (Na$_2$O) | 4 % |
| Potassium oxide | (K$_2$O) | 1 % |
| Calcium oxide | (CaO) | 5 % |
| Strontium oxide | (SrO) | 1 %. |

6. The method of claim 1 wherein said glass has a composition:

| | | |
|---|---|---|
| Silica | (SiO$_2$) | 72 % |
| Sodium oxide | (Na$_2$O) | 15 % |
| Calcium oxide | (CaO) | 8 % |
| Magnesium oxide | (MgO) | 4 % |
| Alumina | (Al$_2$O$_3$) | 1 %. |

7. The method of claim 1 wherein the surface of said concrete block includes a substance fusible at the temperature of the surface.

8. The method of claim 1 wherein said glass is colored.

9. The method of claim 1 wherein said particulate glass has mixed therewith a pigment.

10. The method of claim 1 wherein said particulate glass has mixed therewith a filler.

11. The method of claim 1 wherein said glass has a coefficient of thermal expansion from 4 to 8 × 10$^{-6}$ in/in/°C.

* * * * *